USO05547777A

United States Patent [19]

Richards

[11] Patent Number: 5,547,777
[45] Date of Patent: Aug. 20, 1996

[54] FUEL CELL HAVING UNIFORM COMPRESSIVE STRESS DISTRIBUTION OVER ACTIVE AREA

[75] Inventor: William R. Richards, Springfield, Va.

[73] Assignee: Richards Engineering, Springfield, Va.

[21] Appl. No.: 200,391

[22] Filed: Feb. 23, 1994

[51] Int. Cl.$^6$ ........................ H01M 8/10
[52] U.S. Cl. ............... 429/32; 429/34; 429/210
[58] Field of Search ............... 429/32, 34, 30, 429/210

[56] References Cited

U.S. PATENT DOCUMENTS 3,012,086  12/1961  Vahldieck ............... 429/34 X
3,505,114  4/1970  Rohr ............... 429/32
4,692,391  9/1987  Hirota ............... 429/34
4,826,741  5/1989  Aldhart et al. ............... 429/32 X Primary Examiner—John S. Maples
Attorney, Agent, or Firm—John R. Mattingly

[57] ABSTRACT

Uniform compressive stress distribution is applied over the active area of a PEMFC stack to increase the contact area between the electrically conductive components of the stack. This increases fuel cell stack efficiency. Fuel cell stack is constructed as a modular component readily connected with like modules for providing fuel cell stack configurations capable of meeting a wide range of power generation for application to vehicles, including submersible vehicles up to utility power requirements.

15 Claims, 9 Drawing Sheets

FUEL CELL HAVING UNIFORM COMPRESSIVE STRESS DISTRIBUTION OVER ACTIVE AREA

FIELD OF THE INVENTION

The invention relates to fuel cells, and in particular to PEFC/PEMFCs fuel cells arranged in a stack to which a high uniform compressive force can be applied over the active area of the cells.

BACKGROUND OF THE INVENTION

Fuel cells, in particular PEFCs or PEMFCs (hereinafter just PEMFCs), have been considered for power generation applications for many years. Many innovative improvements in operational performance capability have been achieved. Specifically, efficiencies have been increased to 65% at 1 amp/cm$^2$; water/thermal management problems have been resolved; and the use of thin film polymer electrolyte (or proton exchange membranes) with reduction in the thin film catalyst layers has been achieved. Additionally, increased energy density, both gravimetric at 60 Watts/lb, and volumetric at 5000 Watts/ft$^3$, with stack sizes of approximately 1.5 to 20 KW are now available.

The potential use of PEMFCs as commercially viable alternatives to high energy density batteries, or different types of fuel cells such as PAFC, MCFC, and SOFC, is limited primarily by manufacturing cost considerations, and has consequently limited the general acceptance of PEMFCs in many applications. PEMFCs offer comparable performance as the other fuel cell candidates, at significantly lower operating temperatures, and potentially lower maintenance. Life expectancy/reliability, vs the high energy density battery candidates is significantly better, as compared to the total number of recharge cycles that can be achieved. These factors indicate that PEMFC market potential, for applications in mobile land-based vehicles, submersible manned vehicles, AUV work vehicles, and fixed-site utility power generation, etc., is primarily limited by a cost threshold not realized by existing configuration.

This threshold, at approximately $1000/KW, (1993 dollars) would enable PEMFCs to be considered for utility power applications, and, with their approximately 25% improvement over competitive coal-fired power plant throughput efficiency, could be an economically viable choice, providing reduced fuel consumption costs. Similarly, for mobile applications, wherein gravimetric and volumetric energy density is also of critical importance, performance vs cost tradeoffs dictate whether they offer an economically viable choice vs the alternative battery candidates.

These varied applications run the gamut from required power output capability from 1.5 to greater than 2 MW. Any specific design embodiment for a unique application implies a limited market niche, and consequently an inability to realize the economies of scale to be realized in high volume manufacturing operations. These design specific embodiments may possess relatively high efficiency, but at a penalty of reduced energy density. Similarly, they may possess low efficiency but at a high energy density. Additionally, they may be more readily suited to operation using stored fuel and oxidant supplies, vs using reformed fuel and air.

In summary, the selection of PEMFCs over the alternative candidate solutions for power generation would be enhanced, if the preferred embodiment of the design provided a modular/building block stack assembly providing high efficiency, high energy density, amenable to low cost of manufacturing, and capable of providing output power generation in 7.5, 15, 30, 60, 240 KW (and higher) increments, such that tailoring to the application intended is facilitated. This basic building block stack or module, would provide a single solution for the variety of applications, and realize additional economies of scale through a larger market potential capability.

SUMMARY OF THE INVENTION

The present inability of the prior art PEMFCs to meet the aforementioned objectives is resolved by the analyses provided as part of the present invention. These analyses demonstrate that the present inability is more related to issues regarding mechanical configuration/material properties, than to electrochemical issues. Additionally, that the phenomenon of "contact voltage drop" between the stack conductive elements, vis-a-vis effective current density, dictates the achievable cell potential voltage to be realized in both the activation and the resistive polarization regions. This "contact voltage drop" results from inadequate compressive stress distribution levels between the stack conductive elements, and is resolved through improved stack preloading considerations, to realize a high uniform compressive preload over the entire cell active area. The achievement of a high uniform compressive stress level results in a higher conductive area in contact being generated between the active area conductive elements, thereby reducing the effective current density. The realization of this reduced current density yields lower IR losses. Finally, the resultant stack design configuration, so realized, is shown to be highly modular in nature, amenable to low cost manufacturing/assembly techniques, and capable of providing both higher efficiency, at higher energy density.

The present invention provides a comparative analysis of existing PEMFC configurations from a structural mechanical/material properties point of view, and identifies a preferred embodiment capable of achieving a high uniform compressive stress distribution over the multi-cell stack active area, not achieved by prior art configurations. This analysis recognizes that the real current density for existing PEMFC designs is determined by the measurement of net current, divided by the presumed cell active (or conductive) area. The actual cell active area is different as determined by the analysis provided by the present invention than that of the presumed cell active area, due to the preloading conditions generated in the prior art configurations.

It is an object of the invention to analyze a PEMFC stack configuration with respect to the elastic, or spring stiffness of the stack assembly.

It is an object of the invention to construct a PEMFC with selected electrode and bipolar plate materials, in conjunction with associated elastomeric elements, to achieve application of preload forces primarily to the active area of the PEMFC stack assembly.

It is an object of the invention to reduce the associated contact voltage drop losses exhibited between multi-cell conductive elements of the stack, by increasing the active area conductive surface in contact, through application of a high, uniform preload compressive stress level. The increased effective area in contact provides reduced effective current density, and consequently minimizes both the activation and the resistive polarization losses.

It is a further object of the invention to provide a modular/building block PEMFC configuration, wherein each module of a stack has a plurality of fuel cells. These modules can be joined to one another to form series, or parallel, arrays from 7.5 to greater than 240 KW (or higher) output power capability. Each module can be manufactured using automated/mass production techniques.

It is an object of the invention to provide a fuel cell stack that has achievable cell potential voltages significantly greater than that of the prior art over the same current density operational envelope.

It is a further object of the invention to provide a bipolar fuel cell stack configuration consisting of a plurality of cells with a stack gravimetric and volumetric power density significantly greater than that of the prior art.

DETAILED DESCRIPTION OF THE PREFERRED EMBODIMENTS

The design of existing PEMFCs, as evidenced by the patent art and literature, does not address analyzing the physical property of the cell elements as they relate to the mechanical application of compressive force on the cell elements. For improving efficiency of PEMFCs, electro chemistry, electro design, water management, etc. have been considered to have the most significant impact on operating efficiency. The present invention focuses on the structural relationship between the physical components of the PEMFC, and the relationship between increasing compressive force on the cells of the stack and increased operating efficiency of the PEMFC.

Figure 1:
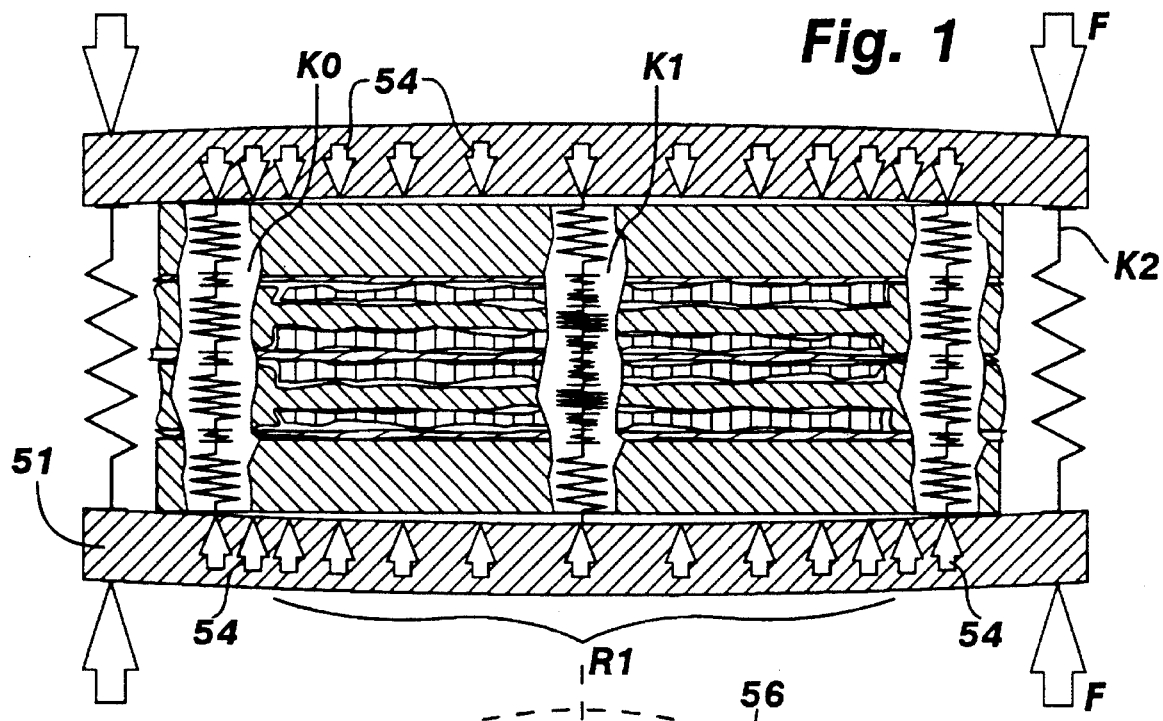
FIG. 1 is a schematic cross-sectional elevation view of a typical PEMFC multi-cell stack illustrating an as manufactured fuel cell stack-up.

An analysis is provided with respect to a typical PEMFC multi-cell stack, shown in FIG. 1.

End plates 50, 51, with tierods (not shown) that connect the end plates together, are shown for establishing some level of preload on a multi-cell stack. Note that the end plates are not infinitely rigid, and that they will deform at their center, as illustrated under the external tierod clamping forces (F). Consequently, the amount of compressive force acting to squeeze the cell stack will vary from some maximum value at the outer edges of the cell stack to some minimum value at the center of the cell stack.

An analysis of spring stiffness (K0, K1 & K2) is illustrated in FIG. 1 in three different areas, each depicting a springs-in-series arrangement resulting from a generic multi-cell stack configuration. The spring stiffness of the active area is designated by K0, the non-conductive area by K1, and the spring stiffness of the external tierod clamps by K2. The magnitude of these values may be determined by summation of the individual elements in the stack, such that each element's cross-sectional area times it's Modulus of Elasticity, and divided by it's effective height (or thickness) yields spring stiffness value in units of #/in. The magnitude of the actual resulting force being applied to each of the respective areas, is determined by the amount of actual squeezing or compressive force generated by the end plates in reaction to the tierod clamping forces.

As illustrated in FIG. 1, due to the end plate deformation in the center, very little force will be generated in the center active area $R_1$, and consequently, very little compressive stress will be developed in this area. This compressive stress, in units of $\#/in^2$, may be derived as follows. The imposed end plate deformation magnitude times the effective spring stiffness, yields force magnitude, and this force magnitude divided by the associated area under consideration, yields the resulting compressive stress that is developed. For purposes of illustration only, this characteristic is depicted by use of the series of arrows 54 in the end plates, such that the density of the arrows in proximity to one another reflects the associated increment of applied external force being distributed over the respective areas of the multi-cell stack. The summation of these load increments is then equal to the net applied external force. This variable stress determines the effective conductor area in electrical contact.

FIG. 1 illustrates a two cell stackup in detail, in order to highlight the exaggerated "as-manufactured" surface features of each of the respective conductive elements, and to reflect the actual variation in element thickness/unit area, flatness and RMS surface finish. This graphically illustrates the microscopic detail of an assembled PEMFC (generic) configuration, and indicates that the potential conductive areas in electrical contact can be significantly less than what is intended. This reduction in the "as-realized" conductive area yields a proportionate increase in the actual current density. This actual current density is not measurable by external means. According to existing methods of analyzing a PEMFC in order to calculate the "actual" current density, one would typically note the output current of the PEMFC configuration, and divide this value by the active area itself, to yield a value for current density in units of $amps/cm^2$. By analysis of the present invention, it is shown that prior art designs are operating at actual current densities significantly higher than the "measured" values.

Figure 2:
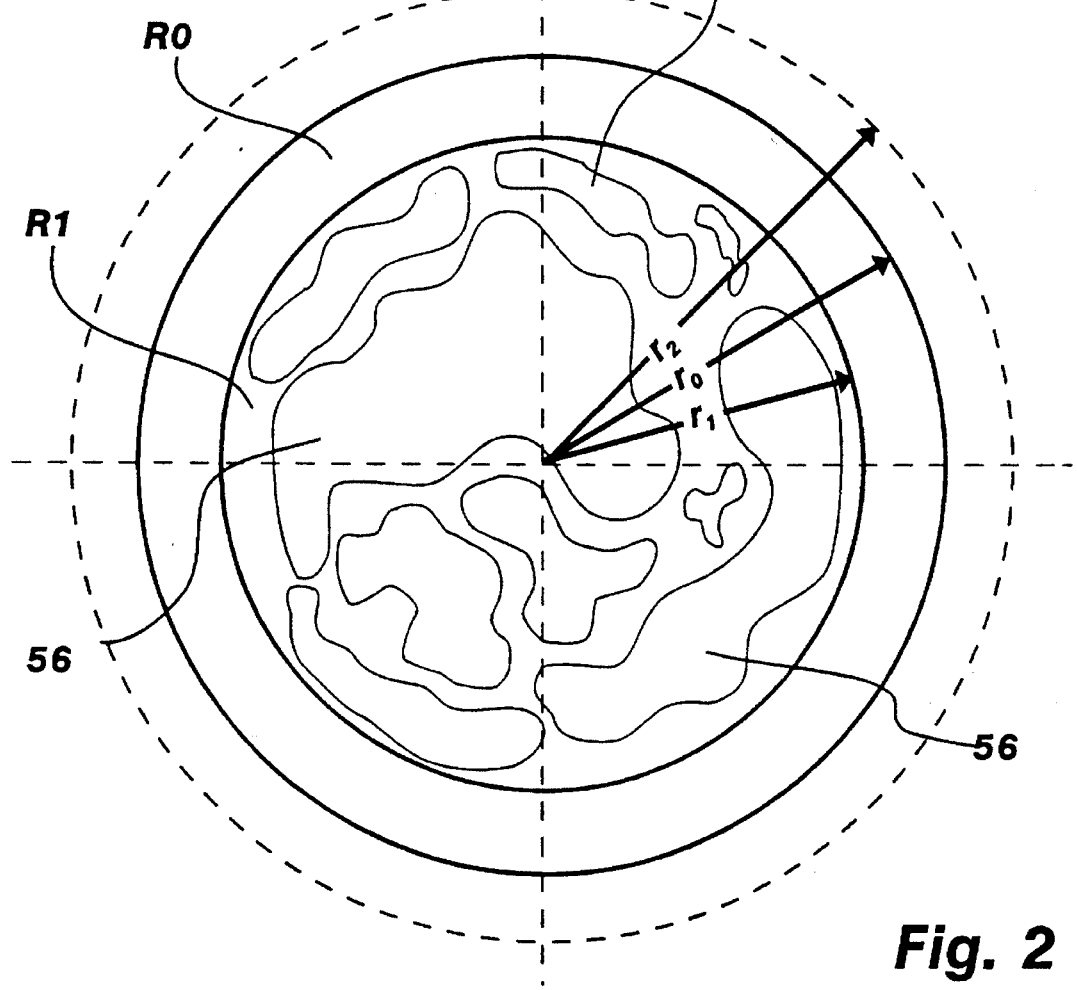
FIG. 2 is a diagram in plan view showing the active and non-active areas of a PEMFC fuel cell like that shown in FIG. 1.

FIG. 2 shows a schematic plan view of a typical existing multi-cell stack like that shown in FIG. 1, with an active area, and a peripheral non-conductive area. The active area is designated by the region enclosed within radius r1. The non-conductive area is designated by the region enclosed between the radius r0 and r1. The periphery designated by radius r2 designates the location of typical prior art external clamping tierods used to effect stack preloading. Regions 56 within the active area R1 designate surface conductive regions that, by way of illustration only, are arbitrarily depicted, and as shown are significantly less than the active area itself. The resultant active area is therefore only that of the regions 56.

FIGS. 1 & 2, taken together, indicate that for a PEMFC multi-cell stack consisting of a plurality of conductive elements, and having a large plate or active area, that the compressive preload will vary in magnitude over the surface of the individual cell active areas due to end plate deflection, and that the "as-manufactured" configuration elements thickness variations, flatness and RMS surface finishes will result in the achievement of an effective active area significantly less than originally intended. The analysis of the present invention also shows that a high uniform compressive stress distribution cannot be applied over the active area using prior art external tierod clamping means. Consequently, the effective (or actual) current density is significantly higher than measured, and the result is an associated increase in both activation and resistive polarization losses.

Finally, that structural (mechanical) considerations and related analytical approaches may therefore be employed, using techniques as described in this invention, to identify critical parameters, quantify relative performance capabilities, and determine desirable (optimal) design features as disclosed in this invention. These optimal design features result in a major improvement in PEMFC performance capability vs the prior art. The analytical techniques may be utilized for the optimization of ALL prior art PEMFC embodiment, to realize improved performance.

The significance of analyzing a PEMFC stack to determine the regions 56 is related to the phenomenon of contact voltage drop, which is readily observed in the art of graphite brushes used in commutator (dynamic) applications. Manufacturer data, such as that provided by National Electric Specialty Products, Morganite Brush Brochure No. 5M792, shows that the contact voltage drop is both a function of preload (spring pressure) and current density. Spring pressures of these graphite brushes are typically low (approximately 2 psi), to minimize frictional heating and wear effects in commutator applications. Additionally, the contact voltage drop is typically large (approximately 1.85 VDC). In relation to commutator applications, this contact drop is acceptable and would constitute a small percentage of the overall applied voltage. However, it's use for a PEMFC application would not be directly possible, in that the total theoretical cell potential voltage is only 1.23 VDC, and we would need two electrodes for each cell.

According to a preferred embodiment of the present invention, a specific porous graphite grade (PG-60, @ approximately 48% porosity) is used for the electrodes. For this material, the allowable current density is typically up to approximately 30 amps/in$^2$ (4.65 amps/cm$^2$) and has a specific resistance of approximately $120 \times 10^{-5}$ ohm in$^2$/in. At this value, the associated IR loss for a brush manufactured from this material would be calculated to be 0.036 volts, for a 1 inch square by 1 inch thick brush. If this value is used for comparison to the measured value of 1.85 VDC at 2 psi spring pressure, the effective area in contact is 0.036VDC/1.85VDC, or approximately 0.019 in$^2$. This shows that the low applied spring pressure of an electrode of known (specified) area is equivalent to a compressive stress. Additionally, this phenomenon is applicable to two different objects, electrode and commutator surfaces in electrical contact, and these two objects are elastically compressed into one another due to this compressive stress. Finally, the smooth surface contact between two objects in contact, flatness with respect to one another, and RMS surface finish also must be considered as contributing factors. Based upon the above observations, it can then be recognized that there exists a possible relationship between the mechanical properties identified above. This relationship, by way of example, may be determined by use of the Hertzian Contact Stress Equation, as described in Shigley, Mechanical Engineering Design, 2nd Edition, 1963, pp. 93–96, or Rothbart, Mechanical Design and Systems handbook, 1964, pp. 13-2, to 13-12. Use of this equation in the subject application is possible by employment of a process of parametric sensitivity evaluation, whereby the relative difference between the magnitudes of the calculated contact area can be determined through changes in the magnitude of each of the parameters in the equation, listed below, wherein:

Let F' equal F times a factor A

Let $E_1$' and $E_2$' equal $E_1$ and $E_2$ times a factor B & C, respectively

Let $d_1$' and $d_2$ ' equal $d_1$ and $d_2$ times a factor D & E, respectively

The Poisson's Ratio ($\mu$), is related to the respective materials chosen for evaluation, and may be held constant for purposes of parametric sensitivity evaluation of the other parameters.

Contact Radius @ $F = 135 \times F$
Increases Value of $a'$ by 5.122X: $a =$ $$\sqrt[3]{\frac{3F}{8} \cdot \frac{[(1-\mu_1^2)/E_1] + [(1-\mu_2^2)/E_2]}{(1/d_1) + (1/d_2)}}$$

Substitution of the revised parameters into the Hertzian Contact Stress Equation below, permits us to determine the change in the original contact surface area of 0.019 in$^2$, or Effective Radius (a)=0.157 in. The new value of a'is determined from the substitution of one or all of the desired changes of the above parameters, as related in the following Hertzian Contact Stress Equation:

By way of example, if we let F'=135×F, then a'=5.122 ×a. Note that the cube root relationship directly determines this value. This increase of 135X in the magnitude of F, or 135×2 psi, equals 270 psi, yields an increase in the effective contact surface area of 26.23X, due to the increase in a' of 5.122X. Similarly, if we were to let E'=0.333×E, then a'=1.442×a.

Again, the effective contact area would increase by 1.632X. If we were to allow both of the above changes, we would then see a change in the value of a' of 5.122X× 1.442X, or 7.384X, and the resultant contact surface area would equal 42.83X. Inspection of this result is what we might expect intuitively, in that increasing pressure between two conductor surfaces in light contact, and in reducing the elastic stiffness (make more readily deformable), would lead to an increase in conductive area in contact.

For the analysis purposes of the invention as presented herein, we note only the increase in the magnitude of F to 270 psi, and the associated increase in contact area of 26.23X. This is a theoretical determination and results in an effective contact voltage drop reduction from the original value of 1.85 VDC at 2 psi, to a new value of 0.062 VDC at 270 psi, and at the same current density.

Figure 3:
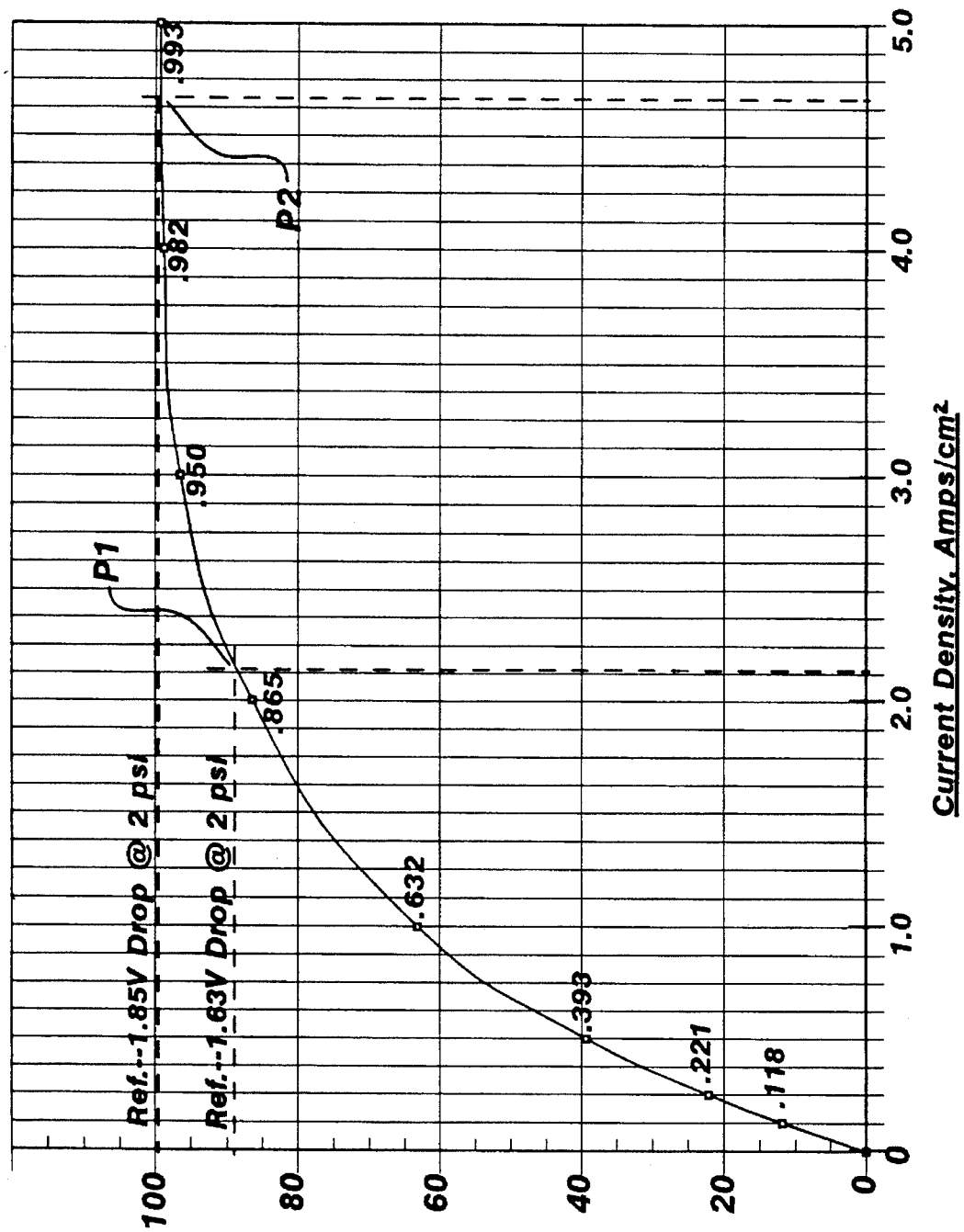
FIG. 3 is a graph showing the relationship between contact voltage drop and current density for a graphite electrode material PG-60.

FIG. 3 presents a normalized plot of the PG-60 contact voltage drop performance characteristic, as a function of current densities between zero and 5 amps/cm². The point P2 represents the documented 1.85 VDC drop at 2 psi, at the maximum usable current density of approximately 4.65 amps/cm². The point P1 shows the predicted 1.63 VDC contact voltage drop at a value of approximately 2.15 amps/cm². This value will be employed in further derivations, for description of the preferred embodiment of the invention, and which is utilized to predict the achievable performance capability of the preferred PEMFC cell configuration disclosed.

It should be noted that the above discussion, although specifically related to one type of electrode material, is also applicable to different conductive elements. The analytical technique employed is identical in process, for the determination of the relative differences to be expected by variation of the mechanical parameters, such that one may determine the improvement in contact area and the associated reduction in the contact voltage drop. The approach described, provides a useful new analytical method for the optimization of PEMFC configurations, the selection of the materials employed, and the desirable manufacturing techniques to be employed for the fabrication and assembly of the various elements of the configuration, and additionally, the critical importance of spring preloading.

This is made readily apparent, when it is recognized that the capability to vary the magnitude of the parameters employed in the Hertzian Contact Stress Equation is limited to realizable changes. As has been shown, we can readily expect to increase the magnitude of F by two orders of magnitude (e.g. greater than 100X). The magnitude of E can typically only be expected to vary by less than a single order of magnitude, by selection of alternative, electrically conductive materials, which possess elastic modulus values between approximately 1.6 and 16×10⁶ psi. Similarly, if we were to vary the surface finish of the conductors from a value of 63 RMS (e.g. rough "as-fabricated") to a 4 RMS (e.g. "high polish"), we would expect a surface feature tolerance variation reduction from 0.001 to 0.005 inches, to a value of 0.00002 to 0.00005 inches, for a net change of up to two orders of magnitude. It can be concluded that applied spring preload and surface finish are up to 10X more important considerations when attempting to achieve an optimal solution of maximum contact area, and associated minimum contact voltage drop.

Figure 4:
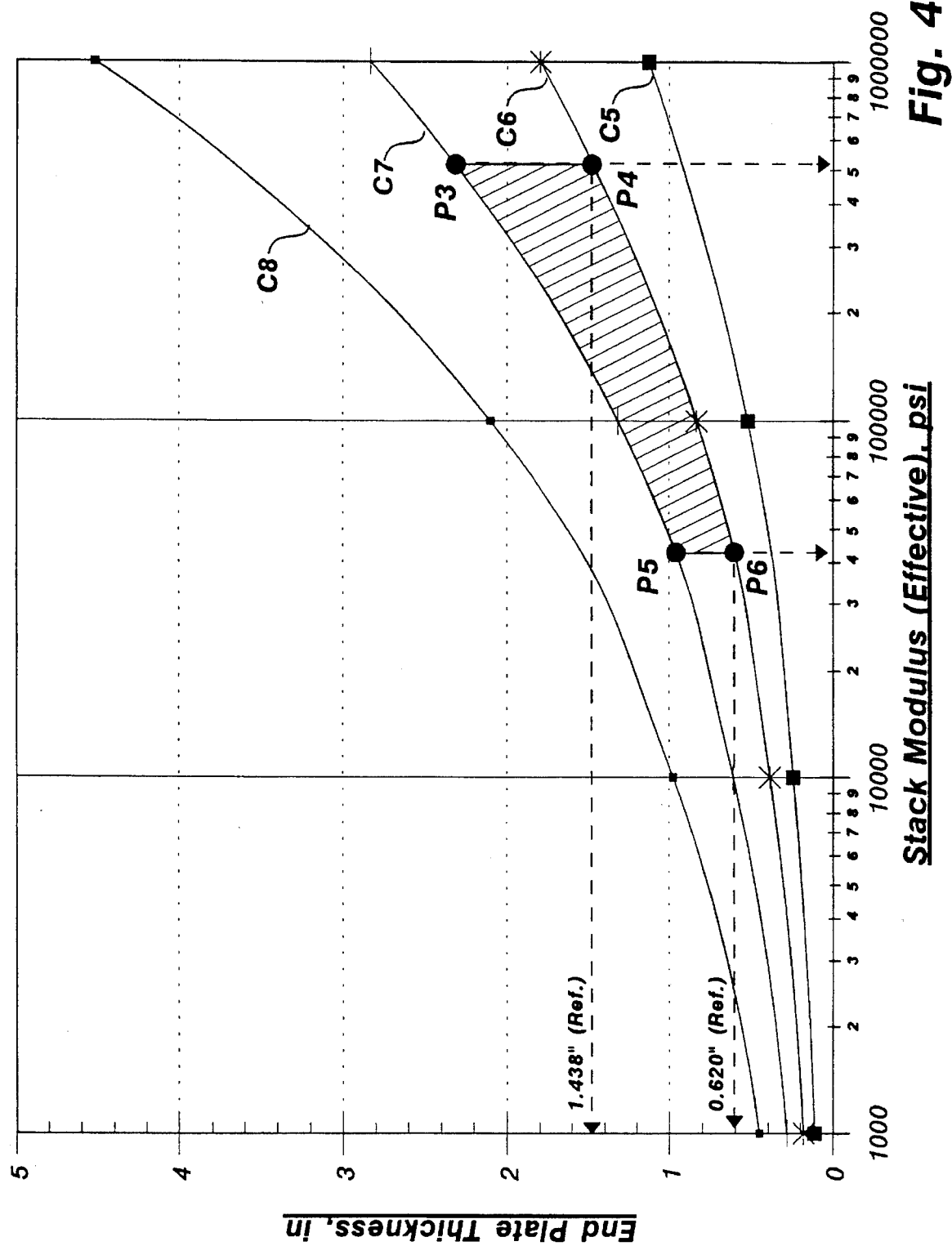
FIG. 4 is a graph of the relationship between end plate thickness and stack modulus for end plates used in a preferred embodiment of a PEMFC multi-cell stack constructed according to the present invention.

The capability to realize a high compressive stress, uniformly distributed over the active area of the multi-cell stack configuration, is required if we are to achieve the desired low contact voltage drop. This capability is difficult to achieve, as illustrated in FIG. 4. FIG. 4 presents tabulated values for the required end plate thickness vs the "effective" stack Modulus of Elasticity, and is based upon equations provided in Roark, Formulas for Stress and Strain, 5th Edition, and for calculation of plate bending stresses, Table 24, Cases 10A and 10B. The effective stack modulus is simply the resultant PEMFC configuration values for K0+K1 spring stiffness times the stack height (or thickness), divided by the stack area, regions R0+R1. The four curves depicted are identified as follows:

The C8 curve represents a Fixed Support plate configuration having a span of 18 inches (with active area of 15.26 in. dia.)

The C7 curve represents a Simple Support plate configuration having a span of 9 inches (with active area of 7.50 in. dia.)

The C6 curve represents a Fixed Support plate configuration having a span of 9 inches (with active area of 7.50 in. dia.)

The C5 curve represents a Simple Support plate configuration having a span of 4.5 inches (with active area of 3.75 in. dia.)

The designation Fixed Support is for the condition of support for a beam or column or at the edges of a plate or shell that prevents rotation or transverse displacement of the edge of the neutral surface, but permits longitudinal displacement. This condition would be applicable to a PEMFC configuration employing a rigid housing to with the end plates are firmly affixed.

The designation Simple Support is for the condition where both rotation and transverse displacement are permitted, including longitudinal displacement. This condition would be applicable to a PEMFC configuration employing tierods.

The equations listed below are derived from Cases 10A & 10B, Table 24 of Roark, wherein the calculated values of the end plate deflection are related to the stack deflection, and are set equal to 70% of the stack deflection value. This constraint enables one to assess the required end plate thicknesses required at a uniform compressive preload stress of 270 psi±30%. The uniformity in preload compressive stress is therefore maintained at ±30% of the desired value over the stack area being evaluated.

FIXED SUPPORT:

$$\text{End Plate Thickness, } t^3 = \frac{0.60\, r_{span}^4\, (E, \text{stack})}{(E, \text{end plate})(X, \text{stack ht.})}$$

SIMPLE SUPPORT:

$$\text{End Plate Thickness, } t^3 = \frac{2.37\, r_{span}^4\, (E, \text{stack})}{(E, \text{end plate})(X, \text{stack ht.})}$$

Inspection of these equations shows that a Simple Support PEMFC configuration results is an approximately 4× increase in end plate deflection vs that of a PEMFC configuration employing Fixed Support. Additionally, a doubling of the span distance results in a 16× increase in the end plate deflection (for either case). Finally, the induced bending stresses for a doubling of the span distance results in a 4× increase. If we decide to achieve the same minimum value for end plate deflection using a condition of Simple Support vs that of Fixed Support, we would need to increase the end plate thickness by 1.58×. If we arbitrarily decide to double the span distance, and keep the same end plate deflection, we would need to increase the end plate thickness by 2.52×. In evaluating a PEMFC configuration of 9 in. span, for example having a Simple Support configuration and having an effective modulus of elasticity of 1×10⁶ psi for a 4 in. high stack, the required end plate thickness would be approximately 2.8 inches. If the stack modulus were 10×10⁶ psi for the same stack height, the required end plate thickness would be approximately 6.1 inches. Noting that typical prior art PEMFC design configurations use Simple Support, and have an effective stack modulus of greater than 1×10⁶ psi, we observe that the desired end plate thickness required to achieve the uniform compressive preload stress of 270 psi±30% would have to be in excess of 2.8 inches. This value, for the two end plates, would then be equal to 140% of the stack itself, increasing the overall height of the stack assembly from the initial 4 inches to a value of 9.6 inches. Obviously, no prior art configurations employ end plate thicknesses of this magnitude, and by extension, are consequently incapable of achieving the high level of uniform preload compressive stress desired in the preferred embodiment of the invention being disclosed. By this same reasoning, comparison to measured performance capabilities of similar prior art stack designs demonstrates overall performance degradation for the stack having an 18 inch span, vs that having a 9 inch span. Stack diameter is critical, being a 4th power design driver, and therefore improved performance would be expected with smaller diameter PEMFC stack designs, and associated less sensitivity to the variations in end plate thicknesses employed.

If an applied preload force of greater than 132,000 is assumed to be achieved by use of a multiplicity of tierods, with the equivalent stack spring stiffness equal to stack area times modulus divided by the height, or approximately $16 \times 10^6$ #/in, the stack compression would be approximately 0.0083 inches. Assuming that the consequent allowable end plate deflection would therefore be limited to 30% of this value, or 0.0025 inches, we can observe the magnitude of the problem in being able to achieve the desired level of uniform compressive stress, vs the required end plate thicknesses that would be required.

Based upon the above assessments, the preferred embodiment of the invention may be described by reference to the four points depicted in FIG. 4. Point P3 indicates the starting point for a basic 9 inch span multi-cell stack configuration having an effective modulus of approximately 510,000 psi, 4 inch height, and Simple Support configuration. It should be noted that this particular configuration utilizes Shore 70A durometer hardness gaskets in the non-conduction region R0, such that the magnitude of K0 is less than 2.5% that of the active region R1 value for K1. This assures that the stack effective spring stiffness is essentially that of the active area alone. A cursory review indicates that the end plates would be at least 2.3 inches thick, and consequently, the design recommended by this analysis would utilize a housing to realize a Fixed Support configuration to achieve an adjusted value for end plate thickness (Ref. Point P4) of approximately 1.438 inches thick. This value would still be considered too large, however.

Points P5 and P6 indicate the adjustment possible in reducing the stack effective modulus, by incorporation of compliant pad elements, which are part of the preferred embodiment of the present invention to be discussed in greater detail hereinafter, below each of the end plates, and by also increasing the desired stack height by a factor of 4× (the preferred embodiment incorporates 4 modular stack elements in series). The resultant stack effective modulus of approximately 41,000 psi is then realized, and the required end plate thickness (ref. point P6) would be less than 0.620 inches. This value is acceptable, resulting in an overall stack height of less than 21.0 inches, with 16.0 inches being allowed for the incorporation of the individual cell/power generation elements. Note that putting four modular stack elements in series, yields a reduction in the stack effective modulus of approximately 4×, to a value of approximately 127,500 psi. The incorporation of the compliant pad elements permits realization of a further reduction in the stack effective modulus of approximately 68%, to a value of 41,000 psi.

It is through use of the compliant pad elements that thermal expansion effects are also minimized, such that preload stresses (generated via induced stack deformation) are not increased above the desired value of 270 psi±30%. Design analysis indicates that a+100° F. change in operating temperature, going from a cold start at 70° F. to an equilibrium temperature condition at maximum power output, could result in an overall change in the single module stack height of approximately+0.006 inches. This value is 10× that of the allowable end plate deflection, and would result in an increase in the preload compressive stress of the same factor. A stress level of this value is unacceptable, in that a currently accepted limit for the proton exchange membrane compressive preload stress is considered to be less than 600 psi. The use of compliant pads provides a capability to accommodate this large change in stack height, without significantly altering the pre-established or pre-load compressive stress levels.

In summary, FIG. 4 graphically illustrates the problem in achieving the desired levels of uniform compressive preload stress required to reduce contact voltage drop to acceptable levels, and to the realization of a reduced level of effective current density, by a proportionate increase in the effective contact area of the conductor elements within the individual cells. Furthermore, it suggests that prior art designs for end plates thickness and support conditions are inadequate, and by extrapolation, that the effective current densities of the various existing PEMFC designs are significantly higher than past measurements indicate. The preferred embodiment of the present invention attempts to resolve the above difficulties.

Tables 1 & 2 provide a tabulation of the calculated values of the achievable cell potential voltage for the preferred embodiments of the present invention, referred to as Mod.1 and Mod.2. Table 1 provides a summary of the Mod.1 configuration, wherein four stacks, of 28 cells each, employing Nafion type 117 proton exchange membranes with PG-60 electrodes, and bipolar plates of aluminum type 1100-H0, yield a nominal 30 KW output PEMFC configuration, operating at approximately 1.10 amps/cm$^2$. Table 2 provides a summary of the Mod.2 configuration, wherein four stacks of 56 cells each, and employing Nafion type 112 proton exchange membranes with PG-60 electrodes, and bipolar plates of aluminum type 1100-H0, yield a nominal 60 KW output PEMFC configuration, operating at the same current density. The Mod.2 configuration has the same weight/envelope as the Mod.1 configuration, with both configurations weighing less than 175#, and an envelope of less than 11.75 inches OD×less than 25.0 inches long. Both configurations have a 7.50 diameter active area, equal to 285 cm$^2$.

| AMPS/CM$^2$ | % CONTACT DROP (Ref. 1.63 V) | ELECTRODE(S) VOLTAGE DROP | ELECTRODE(S) RESISTIVITY | TOTAL CELL RESISTIVITY | VOLTAGE PER CELL |
|---|---|---|---|---|---|
| | | Mod. 1 Configuration with Nafion Type 117 | | | |
| 0.0625 | 0.118 | .00776 | .12416 | .34416 | 1.115 |
| 0.125 | 0.221 | .01452 | .11616 | .33616 | 1.095 |
| 0.250 | 0.393 | .02583 | .10332 | .32332 | 1.086 |
| 0.500 | 0.632 | .04154 | .08308 | .30308 | 0.986 |
| 1.000 | 0.865 | .05685 | .05685 | .27685 | 0.860 |

| AMPS/CM² | % CONTACT DROP (Ref. 1.63 V) | ELECTRODE(S) VOLTAGE DROP | ELECTRODE(S) RESISTIVITY | TOTAL CELL RESISTIVITY | VOLTAGE PER CELL |
|---|---|---|---|---|---|
| Mod. 2 Configuration with Nafion Type 112 | | | | | |
| 0.0625 | 0.118 | .00776 | .06208 | .12508 | 1.129 |
| 0.125 | 0.221 | .01452 | .05808 | .12108 | 1.122 |
| 0.250 | 0.393 | .02583 | .05166 | .11466 | 1.108 |
| 0.500 | 0.612 | .04154 | .04154 | .10454 | 1.085 |
| 1.000 | 0.865 | .05685 | .02842 | .09142 | 1.046 |

A brief description of the tables is as follows:

Column 1 lists the current density;

Column 2 lists the associated contact drop at the current density value listed in Column 1, from FIG. 3. Note that this value is derived at an apparent 2× current density, to account for the bipolar plate 50% "open area", required for the hydrogen/oxygen gas distribution passages;

Column 3 lists the calculated adjusted value for the contact drop, using the K1 factor (only) to account for the increased effective contact area of the two electrodes at 270 psi±30%; K2 and K3 factors, as described below, are not considered in this tabulation. The calculated values, as listed, are therefore conservative;

Column 4 lists the calculated electrodes resistivity, by dividing the value in Column 3 by the value in Column 1;

Column 5 adds the Nafion resistivity (0.22 ohm-cm² for type 117, or 0.063 ohm-cm² for type 112) to the values listed in Column 4; and Column 6 lists the calculated cell potential voltage, by multiplying Column 5 by Column 1, and adding the Delta V activation voltage. The difference in the remaining value, from the 1.23 theoretical cell potential, is the realizable cell potential voltage.

The general methodology employed for determination of the achievable cell potential voltage listed in the tables, may be summarized in a simplified Cell Potential Voltage equation. This equation models the accepted interpretation of an activation polarization region, a region of rapid exponential decay from the equilibrium no-load condition at low current densities less than 0.1 amps/cm², a region of resistive polarization, and a region of linearly dependent increasing resistive loss as a function of increasing current density. The Cell Potential Voltage equation is listed below:

$$V_{cell} = 1.23 - \text{Delta } V - (K1 \times K2 \times K3 \times V_{contact}) - R_{pem} \times I$$

The first term, 1.23 VDC reflects the theoretical cell potential voltage for a hydrogen-oxygen fuel cell. The second term, Delta V, is an allowance factor to account for the activation polarization loss. The third term, (K1×K2×K3) times the $V_{contact}$ voltage values, as tabulated in FIG. 3, determines the calculated PG-60 electrode(s) effective voltage drop. The fourth term, $R_{pem}$, (in units of ohm-cm²) times the current density, determines the associated PEM (Nafion type 117 or 112) voltage drop. The bipolar pure aluminum type 1100-H0 plate, having less than 0.036% of the voltage drop of the electrodes is negligible, and is not considered in the equation terms.

Figure 5:
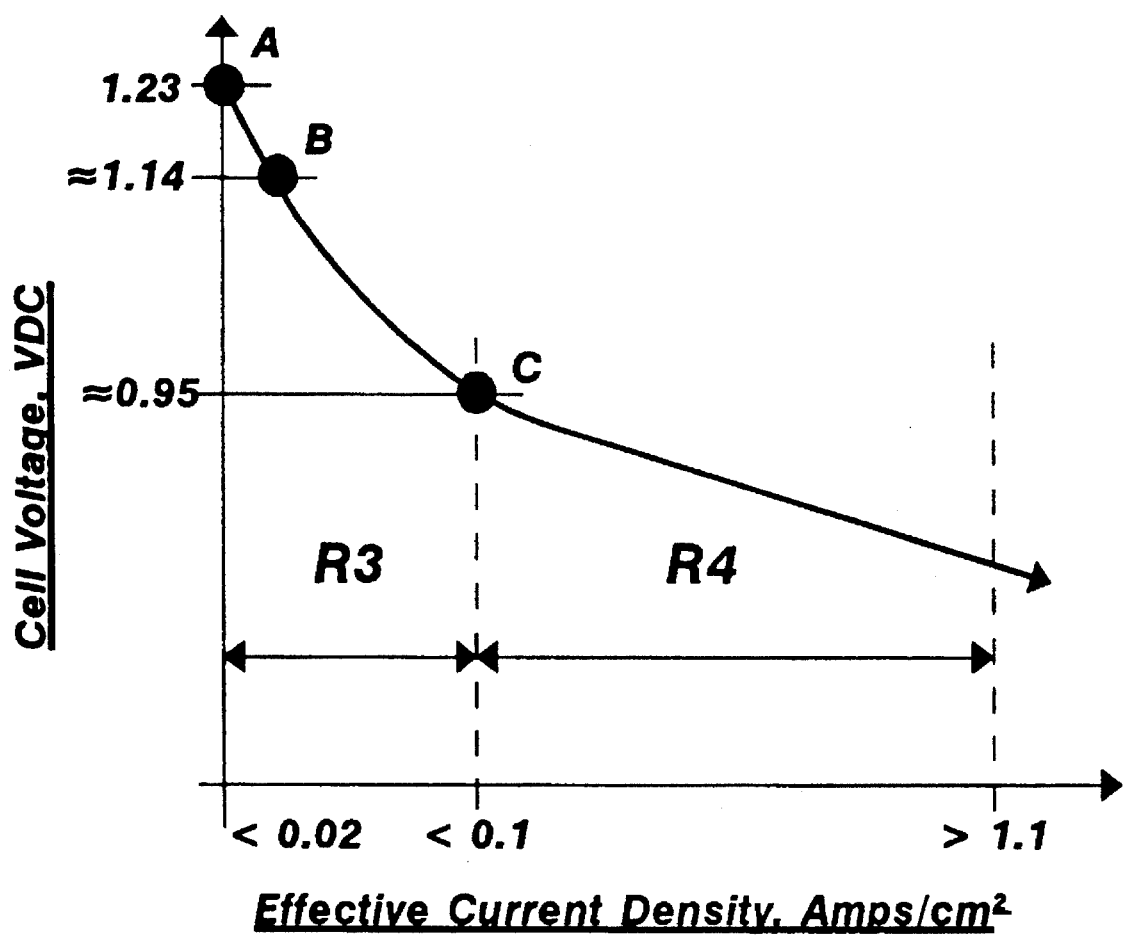
FIG. 5 is a diagram showing the relationship between cell voltage and effective current density for a PEMFC constructed according to the present invention.

The Delta V term, employed for determination of the cell voltage values tabulated in Tables 1 & 2, is based upon a value of 0.093 VDC. This value can be directly compared to prior art values of approximately 0.28±0.05, and reflects a conservative assessment of the improvements to be gained in achievement of lower effective current density at higher uniform compressive preloading. FIG. 5 illustrates the result of a greater than 5× reduction in effective current density (due to increased effective contact area) on the activation polarization loss. The influence of current density, in describing the activation polarization effect is described by K. H. Spring, *Direct Generation of Electricity*, 1965, para. 2.3.2, and FIG. 2.4 "The Energy Barriers in the Neighborhood of an Electrode Surface During Electron Transfer".

Based upon the relationships identified in Spring, and upon actual test data results of two different prior art PEMFC configurations, it is possible to make a direct extrapolation to the preferred embodiment configuration's activation polarization voltage value. This is accomplished as follows.

Figure 6:
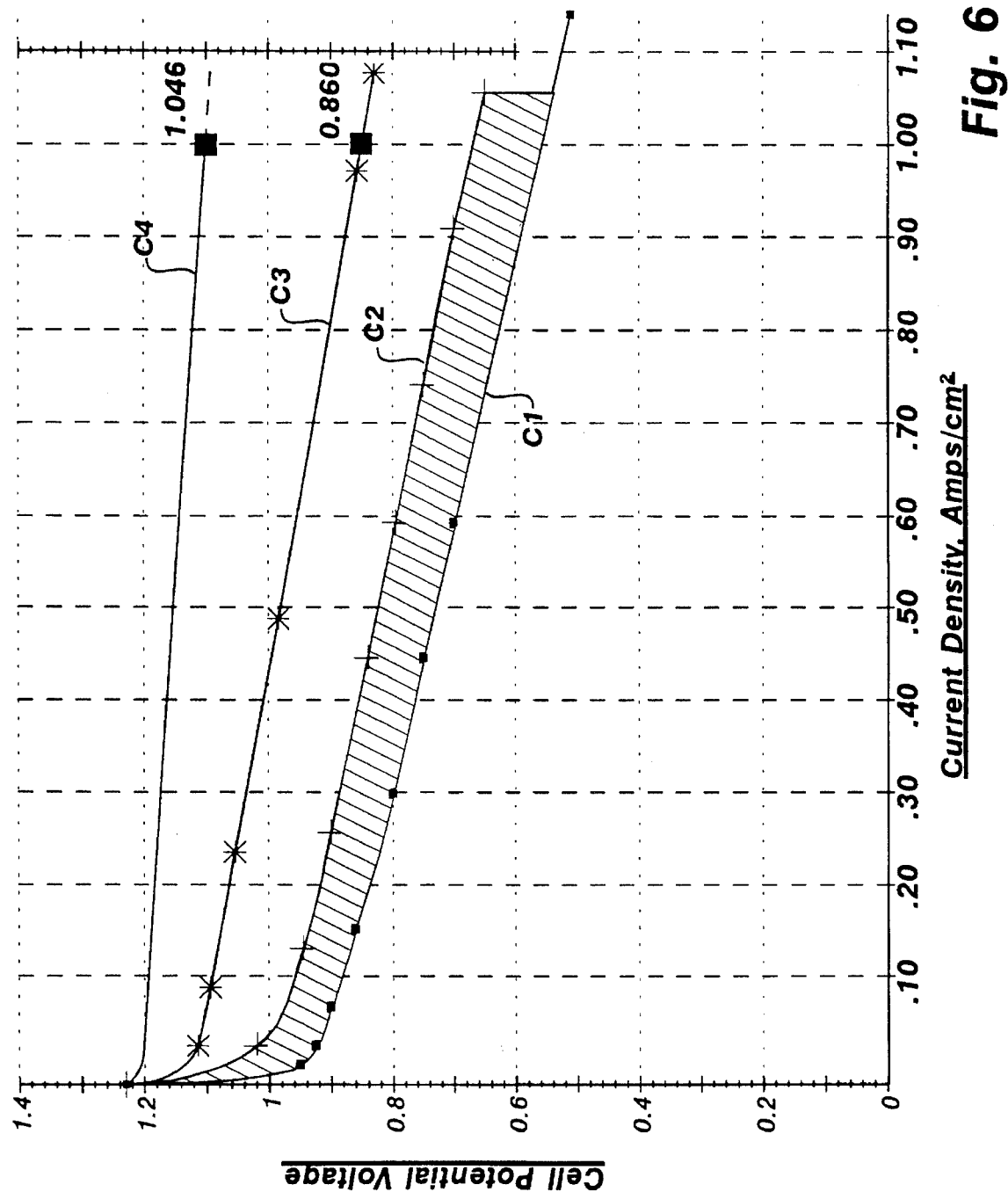
FIG. 6 is a diagram showing the relationship between cell potential voltage and current density for PEMFCs constructed according to the present invention, in comparison with the prior art.

FIG. 6 presents test results of two prior art PEMFC devices, device no. 1 and device no. 2 (Curves C1 & C2, respectively), and plots comparative performance for both the Mod.1 (Curve C3) and Mod.2 (Curve C4) configurations. The C3 and C4 Curves are based upon the values calculated in Tables 1 & 2. Curve C1 reflects test data of PEMFC device no. 1, which has an 18 inch diameter, 1180 cm² active area PEMFC configuration. Curve C2 reflects data of PEMFC device no. 2, which has a 9 inch diameter, 316 cm² active area PEMFC configuration. Both devices employ Nafion type 117 proton exchange membranes, and are multi-cell configurations using Simple Support end plates.

As expected, by the analysises previously presented, the larger PEMFC configuration is significantly less efficient. Additionally, inspection of the activation polarization regions of each of the prior art configurations shows that the larger diameter configuration exhibits greater than 2.5× the slope value for this region. This fact is especially significant when one considers that any increase in the active area should result in a proportionate reduction in the resistivity of the cell configuration, at the same current density. The device no. 1 configuration has 3.73× the active area of device no. 2, yet test results show very low resistive polarization loss gains, and greater than a 2.5× increase in the activation polarization losses. It is concluded that these test results provide positive confirmation of higher effective current density being exhibited, due to the reduced effective contact areas of the larger configuration. Based upon the above discussion, a conservative value for the Mod.1 & Mod.2 configurations activation polarization loss is therefore determined to be less than 0.093 VDC.

The K1, K2 and K3 factors are derived from use of the Hertzian Contact Stress Equation, whereby the parametric assessment of alteration in preload force, materials choice modulus of elasticity, and surface flatness/RMS finish may by respectively evaluated, such that the relative improvement in effective contact area may be determined.

In summary, the indicated performance capability for both the Mod.1 and Mod.2 PEMFC configurations is significantly better than prior art embodiments. FIG. 6 shows that an approximately 20% improvement in cell efficiency is possible, based upon achievement of a high uniform compressive stress to increase the effective contact area.

The preferred embodiments for the Mod.1 and Mod.2 PEMFC configurations employs greater than 3× stoichiometric gas recirculation of the oxygen stream to assure removal of both the electro-chemical and the electro-osmotic water produced in the cell reaction. Water management is a critical performance constraint on PEMFC operation, and numerous prior art embodiments have employed various strategies to successfully address the issue. The problem may be broken down into several parts: (1) Prevent flooding of the oxygen electrode; (2) Mitigate loss of entrained water from the proton exchange membrane; and (3) Provide gas distribution uniformity, both supply and return, such that the cell electro-chemical reaction occurs over the maximum possible cell active area.

Part (1) of the problem is addressed in the preferred embodiments, by both vapor diffusion and vapor transport considerations being employed to effect complete removal of the water on the oxygen electrode (cathode) side of the cell. This is facilitated by use of the PG-60 electrodes, having a porosity of 48%, and thickness of either 0.031 (Mod.1) or 0.016 (Mod.2), acting as "diffusion wells". This vapor diffusion process is described in Kreith, *Principles of Heat Transfer*, 2nd Edition, 1967, pp. 565–566. Based upon an evaluation using the techniques described in the reference, it may be determined that the water vapor diffusion through the stagnant air "diffusion well" will be greater than 1.54 lbs/Hr.-Cell Electrode (Mod.1). This value is 6.8× the electro-chemical water vapor appearing on the oxygen electrode side (@0.2268#/Hr.-Cell) for Mod.1, and 20× for Mod.2. Vapor transport from the oxygen electrode side of the cell is facilitated by use of oxygen recirculation at greater than 3× stoichiometric consumption at maximum power, to remove the diffused water vapor.

Figure 7:
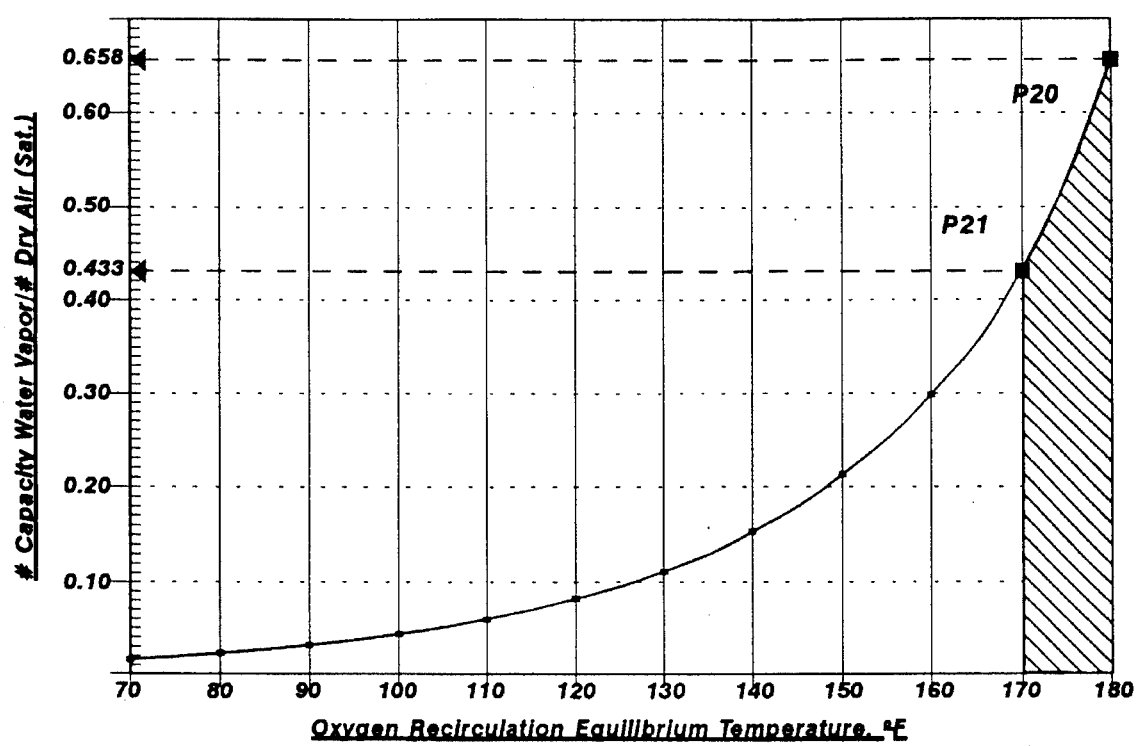
FIG. 7 is a diagram showing the relationship between the vapor holding capacity of a recirculating gas stream and the gas stream operating temperature that is useful in explaining the water management considerations addressed in the design of a PEMFC, according to the present invention.

FIG. 7 illustrates the vapor-holding capacity of the recirculating gas stream vs the gas stream operating temperature. The tabulated data is based upon the *ASHRAE Guide & Data Book*, 1965, and provides a plot of the # capacity of water vapor per # dry air, vs the air temperature. Point P20 indicates that 0.658# of water vapor per # dry air at 180° F., and point P21 indicates a value of 0.433# of water vapor per # of dry air at 170° F. Note that the plot indicates a very rapid decline in the capability of the gas stream to hold water, as the gas stream temperature is reduced below the indicated values. The total stoichiometric recirculation rate, in SCFH, must be in inverse proportion to the vapor holding capacity of the gas stream air temperature. Based upon an oxygen consumption rate at maximum power of approximately 2.55 SCFH per cell, it is observed from the graph that 3× stoichiometric (or 7.65 SCFH) times the oxygen density of 0.082#/Ft.$^3$, yields 0.627# oxygen per hour per cell, or capability to remove approximately 0.345# per hour at 175° F.

This value is adequate for the Mod.1 configuration, which uses the Nafion type 117 membrane, and will account for the additional water vapor appearing on the oxygen electrode side due to electro-osmosis (hydrogen ion transport of water molecules out of the membrane). The Mod.2 configuration, using the Nafion type 112, will provide a greater than 3× reduction in the electro-osmotic transport mechanism, and would permit a reduction in the stoichiometric recirculation rate from 3× to a value of less than 2.5×.

Part (2) of the problem is addressed by making provision for direct insertion of makeup water vapor externally, into the hydrogen gas stream, such that the electro-osmotic water volume is compensated for, and the Nafion membrane water balance is maintained. This makeup water vapor volume will be in direct proportion to the PEMFC power output level. Consequently, by means of external load sensing, preferably output current, proportional control will be maintained on the membrane water balance. The required volume of water to be supplied per unit time is preferably provided by pulsed injection from a pressurized source, such that the water is vaporized as it is being injected into the hydrogen gas stream. Metering of the required volume of water is then a simple process of determination of the number of pulsed injections per unit time, and making the number of pulses per unit time proportional to the output current. Other means may also be employed for effecting a similar result, dependent upon the nature of the PEMFC application, and it's related auxiliary support equipment.

Part (3) of the problem is addressed by making provision for up to 6 each manifolded gas feed passages of 0.3125 diameter, for both the hydrogen and oxygen supply to the individual cell, and with an equivalent gas feed flow area being provided within a waffle plate pattern geometry of the bipolar plate to the electrode to be discussed in greater detail hereinafter, and by use of the PG-60 electrodes having a porosity of 48% (pore size is approximately 0.0013 inches). The Mod.1 electrode, which is approximately 0.031 inches thick, has an air permeability of 9.82 Ft.$^3$/Min. at 0.073 psid, and a water permeability of 1.43 Gallons/Minute at 0.073 psid. Based upon an estimate of less than 5.5 Ft. path "equivalent" length for the main gas feed passages, and hydrogen gas feed of 5.10 SCFH/cell×56 cells/stack×4 stacks/PEMFC assembly, or 19 SCFM in 6 each lines yields less than 3.2 SCFM/line, yielding a pressure drop of less than 0.10 psi. The pressure drop across the PG-60 electrode, at 0.085 SCFM/cell, is less than 0.010 psi. Similarly, for an oxygen feed of 2.55 SCFH/cell, we would have less than 1.6 SCFM/line, yielding a pressure drop of less than 0.32 psi, and the electrode pressure drop would be less than 0.005 psi. At a value of 3× stoichiometric oxygen gas recirculation rate, or 4.76 SCFM/line, the pressure drop would increase from less than 0.32 to less than 1.60 psi. The above values indicate that the hydrogen gas should be supplied at a pressure of greater than 0.15 psi, and the oxygen supply at a pressure of greater than 1.65 psi. These values are very low, and based upon a desired 3 to 10 psi regulated supply pressure capability, thus indicating a robust design margin of safety in the preferred embodiment for both of the gas streams.

Additionally, it should be noted that the waffle plate pattern geometry of the bipolar plate is preferably configured to provide a both a large flow area and a symmetric flow pattern from the main feed lines to all exposed surfaces of the electrode active areas of the cell. The large flow area within the waffle plate grooves is preferably achieved by maintaining groove geometry feature size (groove width and groove depth) equivalent to that of the electrode thickness, such that approximately 50% of the total active area×groove depth yields a maximum free volume flow area. It is also preferred that gas feed path length from these grooved passages and through the electrode to the catalyzed surface of the proton exchange membrane, be minimized. This assures that both the hydrogen and oxygen gases are available at the desired electro-chemical sites of activity over the entire electrode/membrane active area, by facilitating ability of the gases to pass around the raised features of the groove in the minimum path length possible, to reach these sites.

Finally, achievement of thermal management in the preferred embodiments occurs as a result of the complete vaporization of the electro-chemical plus electro-osmotic water on the cathode side of the cell. For the Mod.1 configuration, generating less than 8.75 BTUH/in² of cell active area, and at an $h_{fg}$ of approximately 1032 Btus/#, for water vaporization (equivalent to a cooling effect of approximately 6.32 BTUH/in²) we must provide additional means for heat removal. This residual heat is conductively removed from the multi-cell stack through the highly conductive aluminum bipolar plates, to the exterior exposed surfaces of the stack, and subsequently removed by a cooling water recirculating loop. The total temperature gradient between the interior of the stack, and the external surface of the stack for the Mod.1 configuration is less than 12° F., with this water flow being maintained at less than 5 gpm. This flow is maintained between the annular space generated by the stack exterior and the ID of the stack housing. The annular clearance provided by this annular space is preferred to be approximately 0.010±0.003 inches, such that the water flow velocity is greater than 4 ft./sec., and the Reynolds Number is approximately 3000. Per Kreith, p. 386, Example 8-20, and equation 8-20, and Prandyl number of approximately 1.923, the determined film coefficient is approximately 2600 Btu/Hr.-Ft.²-° F. The associated temperature gradient, from the top of a Mod.1 four stack assembly to the bottom of the stack assembly, will consequently be less than 13.5° F., based upon a total exposed exterior surface area of 1.4 Ft.².

For the Mod.2 configuration, generating less than 4.35 BTUH/in² of cell active area, heat must be provided because the cooling effect due to water vaporization exceeds that of the internal heating effect due to polarization losses. Noting that the Mod.1 configuration must facilitate heat removal equivalent to 2.43 Btu/in.², and the Mod.2 configuration must add heat equivalent to 2.0 Btu/in², the temperature gradients are therefore equal to approximately 10° F. and 11.1 F. respectively, vs the Mod.1 configuration. The Mod.1 configuration requires heat removal, and the Mod.2 configuration requires a similar amount of heat addition. Heat addition is preferably accomplished through heating of the recirculating gas stream, and would reduce the net power output of the configuration by less than 8%.

Compliant pad elements are provided as the preferred component used for meeting the object of providing a uniform compressive stress distribution over the active area of a multi-cell stack. The preferred embodiment Mod.1 and Mod.2 configurations employ Viton, or similar Shore 70A+ hardness elastomeric members for both gasket sealing of the non-conductive area of the stack, and as compliant elements below each of the end plates of the stack. Used as gasket elements (either 0.040 or 0.020 thickness for the Mod.1 or Mod.2 respectively), the Viton functions as both a sealing element, and, of equal importance, as a compliant member to make the effective spring stiffness of the non-conductive area much less than that of the active area. This assures that virtually all of the applied preload force is developed in the active area, and generates the desired level of compressive stress required to achieve high contact area. The compliant elements are used below each of the end plates of the stack (0.080 thickness for either Mod.1 or Mod.2). They serve to provide the necessary compliance to accommodate thermal expansion effects, and consequently, to minimize variation in the pre-established compressive stress magnitude. Both sets of compliant pad elements have a Shape Factor of approximately 0.5. Shape Factor is Compressed Area/Free-to-Bulge Area. Per Erich, *Science & Technology of Rubber*, 1978, p18, equation 19 and FIG. 15, it is shown that there exists an apparent elastic modulus which can be significantly different than that of the published values for the subject elastomer, and is based upon feature area vs thickness, where, $$E_{apparent} = E[1 + (r_o^2/2\ l^2)]$$

Inspection of this equation indicates that $E_{app}$ can become quite large, e.g. at r=4.5 inches, and l=0.16 inches for two end pads in series, $E_{app}$ would be 396.5×E. Assuming a value for E is approximately 1100 psi, $E_{app}$ would be 436,159 psi, and the effective stiffness would be greater than 173×10⁶ #/in. This is virtually incompressible, and obviously provides no compliance. The preferred embodiment solution is to provide an end plate compliant pad consisting of a number of smaller pads with the appropriate feature area vs thickness for each of the pads. The preferred embodiment uses a pad having small pad areas of approximately 0.25 diameter, with uncompressed pad height of approximately 0.040 inches, staggered spacing over the surface of the pad, on an approximately 0.344 inch centerline spacing interval, providing approximately 48% open area, and with each pad having a Shape Factor of approximately 0.5. The resultant pad configuration yields an $E_{app}$ of less than 1.54 E, and an effective spring stiffness of 691#/in×674 pads (distributed over the 9.00 inch stack area) or a net spring stiffness of less than 0.47×10⁶ #/in. This value is acceptable, and will provide the necessary compliance to accommodate the thermal expansion effects of approximately 0.006 inches chance in stack height, and induce less than 30% variation in the initial value of preload compressive stress.

A summary of the PEMFC Mod.1 material properties is provided in Table 3, with reference to the selected elements, and their associated mechanical properties, as follows.

TABLE 3

| | Summary of PEMFC Mod. 1 Component Element Material Properties | | | | |
|---|---|---|---|---|---|
| Component Element | Density, #/in³ | Elastic Mod. × 10⁶ PSI | 7.5 Dia. Active Area Resistance, Ohms | Thermal Conductivity Btu-in/Hr-Ft²-°F. | Thermal Exp. Coef. × 10⁻⁵ in/in-°F. |
| .625 thk. MIC-6 End Plates | .098 | 10.6 | 9.4 × 10⁻⁹ | 1740 | 1.33 |
| .063 thk. B-P 1100-HO Plt. | .098 | 10.6 | 3.2 × 10⁻⁹ (@ 50% A₀) | 1740 | 1.33 |
| .031 thk. PG-60 Electrodes | .038 | 1.76 | 3.4 × 10⁻⁶ (per Cell) | 600 | 0.11 |
| .009* thk. Nafion ty117 | .054 | 0.35 est | 7.7 × 10⁻⁴ | 2.5 est. | 4.7 |
| -or- .0026* thk. Nafion ty112 | .054 | 0.35 est | 2.2 × 10⁻⁴ | 2.5 est. | 4.7 |

TABLE 3-continued

Summary of PEMFC Mod. 1 Component Element Material Properties

| Component Element | Density, #/in$^3$ | Elastic Mod. × 10$^6$ PSI | 7.5 Dia. Active Area Resistance, Ohms | Thermal Conductivity Btu-in/Hr-Ft$^2$-°F. | Thermal Exp. Coef. × 10$^{-5}$ in/in-°F. |
|---|---|---|---|---|---|
| .040 thk. Viton Shore 70A Gskt. | .066 | <.005 (E' Calc.)△ | 2.5 × 10$^{10}$ | 1.58 | 9.0 |
| .080 thk. Viton Shore 70A Comp. Pad | .066 | <.005 (E' Calc.)△ | 1.3 × 10$^{10}$ | 1.58 | 9.0 |
| 3.875 Lg. Alumina Ceramic Hsg. (99%) | .137 | 48.0 | 3.5 × 10$^9$ | 238 | 0.46 |

△The E' Value Reflects the Effective Shape Factor, SF≈.50

The tabulated values are used in the various analyses previously disclosed in this invention, and are required for performance of the various evaluations disclosed. The Mod.2 material properties are similar, except for the following:

The 0.0625 aluminum bipolar plate is 0.0312 thickness

The 0.0312 PG-60 electrode is 0.0156 thickness

The 0.0026 Nafion type 112 is employed (only)

The 0.040 Viton gasket is 0.020 thickness

Figure 8:
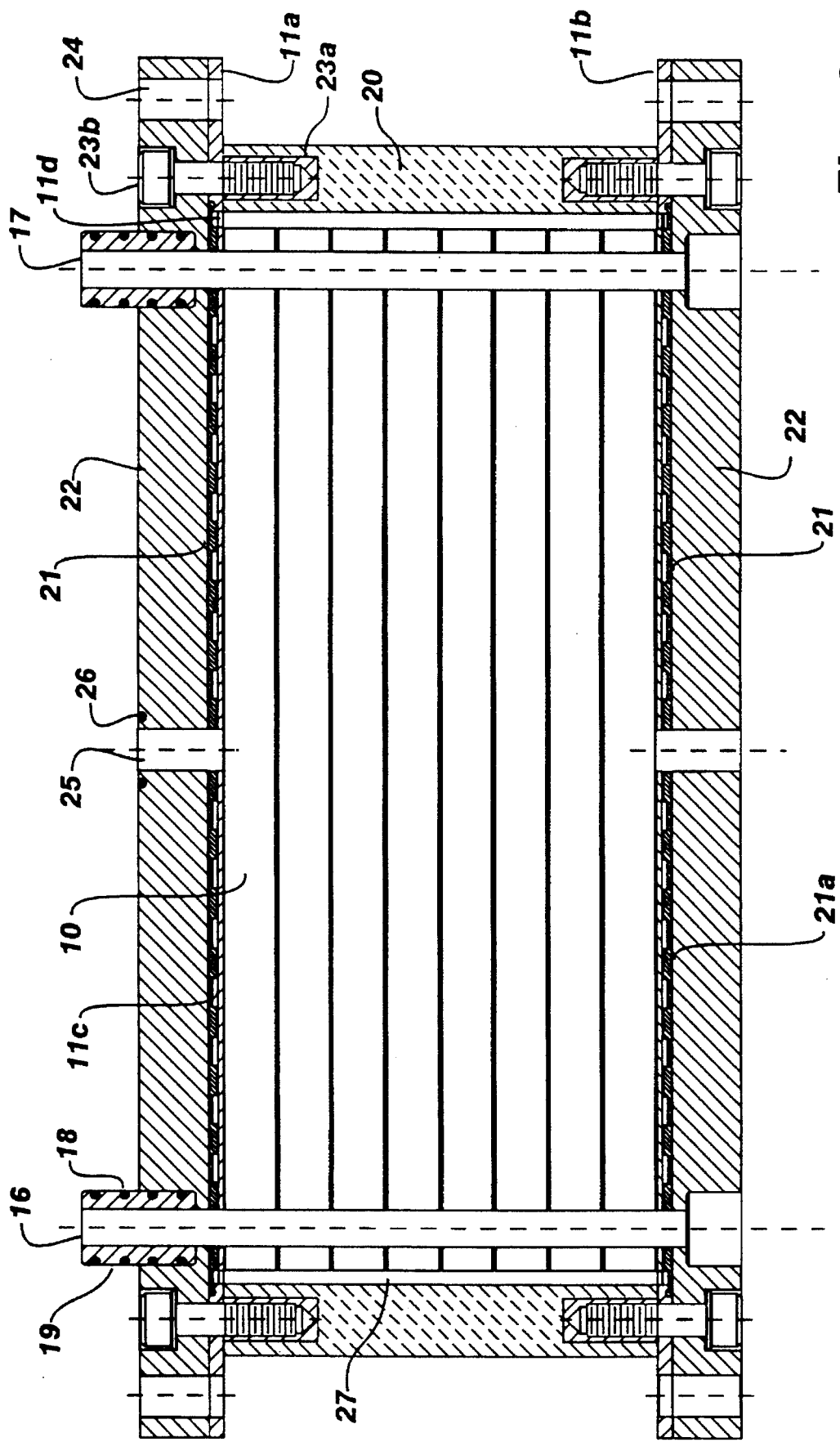
FIG. 8 is a sectional view of a PEMFC multi-cell stack configuration constructed according to the present invention.
Figure 9:
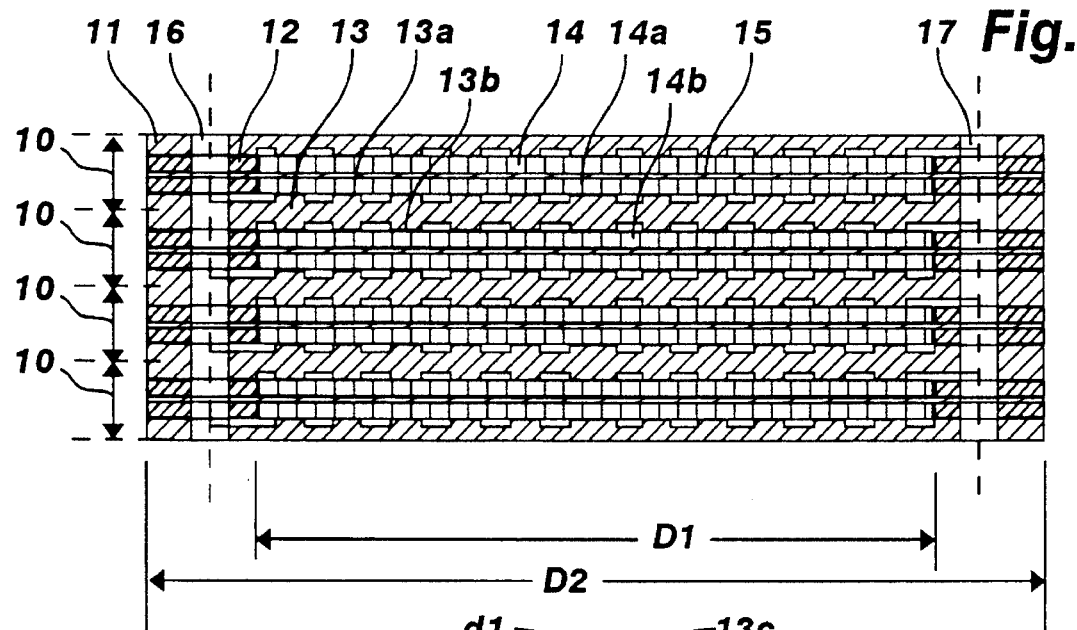
FIG. 9 is a detailed sectional view of several cells of a PEMFC stack constructed according to a preferred embodiment of the present invention.
Figure 10:
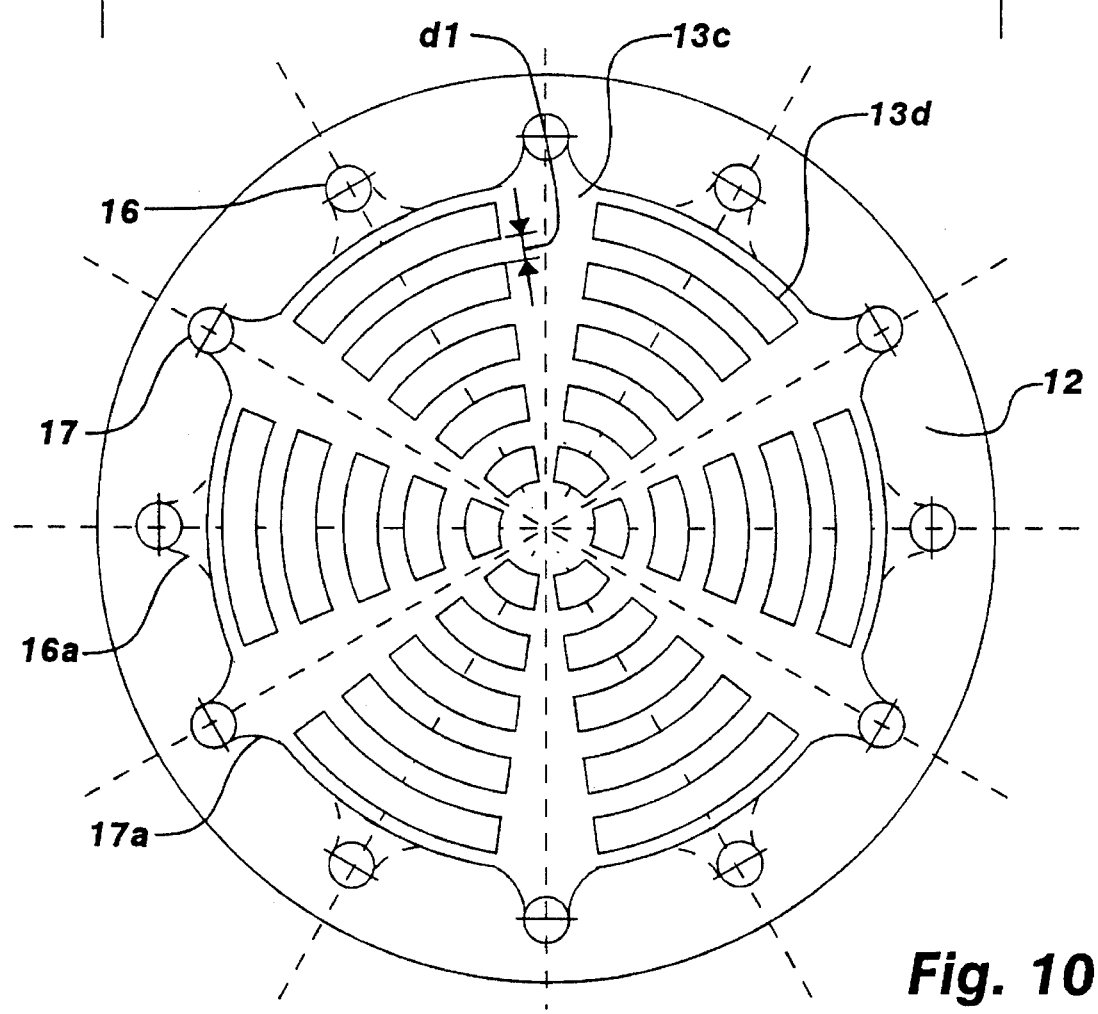
FIG. 10 is a plan view of a bipolar plate and gasket arrangement used in the PEMFC stack configuration according to FIG. 9.

FIG. 8 provides a cross-sectional (elevation) view of the preferred embodiment PEMFC configuration. The configuration depicted is a single, modular, PEMFC stack module 1, consisting of either 28 cells 10 (Mod.1) or 56 cells 10 (Mod.2), and employs an integral housing 20 for the mounting of endplates 22. The endplates 22, in conjunction with cell features shown in FIGS. 9 and 10, provides the necessary uniform compressive stress distribution for achieving the desired performance capabilities previously discussed.

Figure 11:
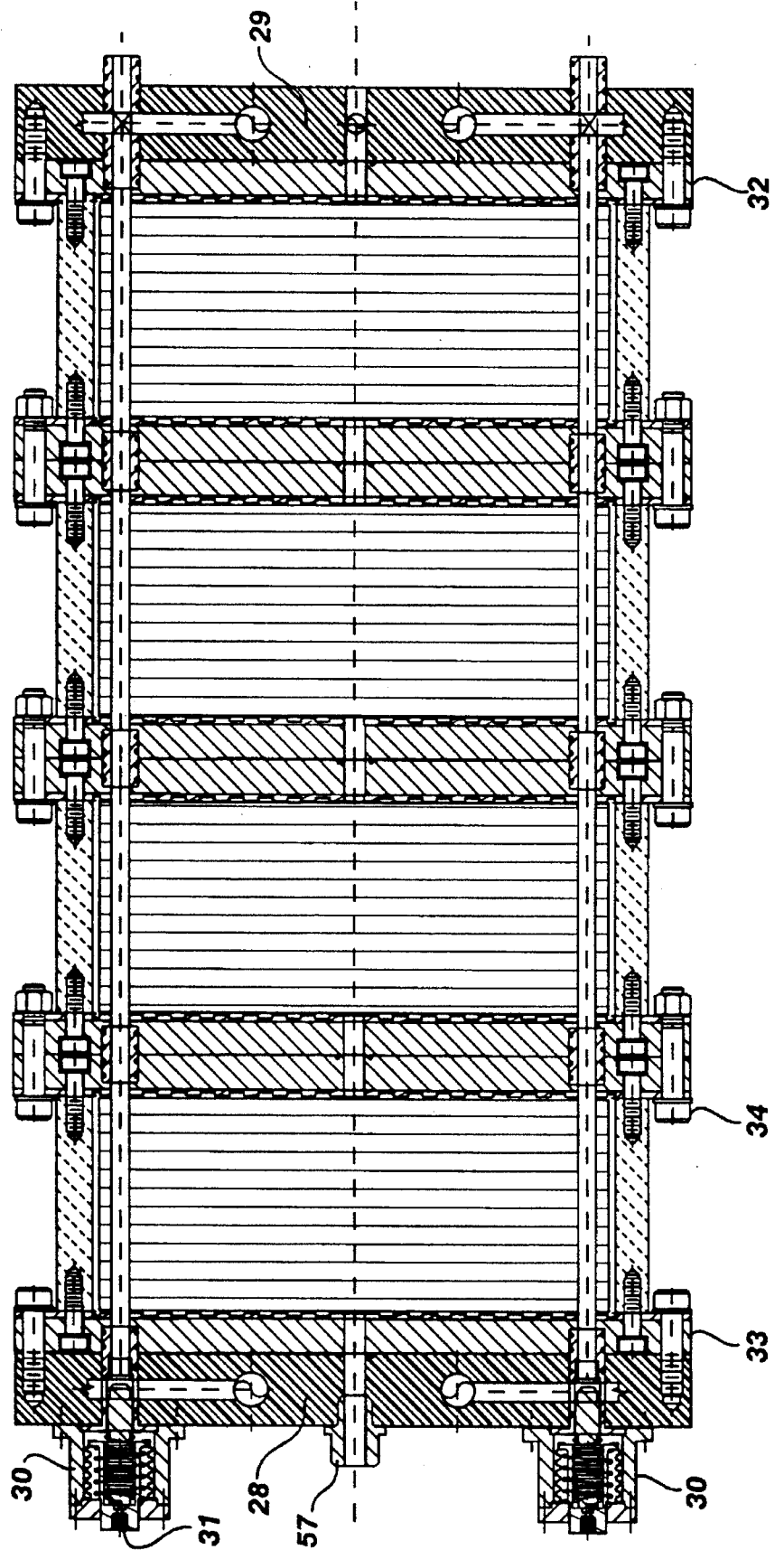
FIG. 11 is a diagram of a plurality of PEMFC stack modules connected together, according to an embodiment of the present invention.

The configuration is preferably modular, permitting the stacking of the single stack module depicted, into an assembly consisting of at least four modules, as depicted in FIG. 11. Both the Mod.1 and Mod.2 configurations have a cell active area of approximately 285 cm$^2$ (7.50 inches diameter). The Mod.1 configuration operates at a minimum 0.86 VDC cell voltage at 1 amp/cm$^2$ current density, or provides greater than 6,863 Watts per module, with peak power output of greater than 7,500 Watts. The Mod.2 configuration operates at a minimum 1,046 VDC cell voltage at 1 amp/cm$^2$ current density, or provides greater than 16,694 Watts per module, with peak power output of greater than 17,929 Watts per Module. The weight/envelope for the module depicted in FIG. 8 is less than 40.94#, 5.162 inches thick× 11.75 OD.

Based upon the very high gravimetric and volumetric power density achievable by either the Mod.1 or Mod.2 configuration (up to approximately 7×, as compared to prior art designs) it is possible to consider derating recommended power output by approximately 50%, such that higher efficiency is achieved. This is considered to be of critical importance in those applications where hydrogen and oxygen stores are limited, and vehicle endurance (range) is considered, and also for those applications for which fuel supply/generation cost is considered. The configurations depicted in both FIGS. 8 and 10 reflect consideration of means to achieve a low cost, easily manufactured and assembled PEMFC, and are intended as amenable to high volume, automated production methods, and using low cost readily available stock materials for all essential elements. A detailed description of each of these elements, and related features of the Mod.1 and Mod.2 configurations is provided in the following.

FIG. 8 provides a cross-sectional (elevation) view of a single, modular stack assembly 1 consisting of a either 28 cells (Mod.1) or 56 cells (Mod.2). Cells 10 are shown in detail in FIGS. 9 and 10.

The module has upper (anode) 11a and lower (cathode) 11b current collector plates, for preferably providing means to effect capability for series stacking of the individual stack modules, and for means to incorporate compliant pad elements below each of the endplates. These current collectors have a 9.20 diameter relief feature 11c that is preferably 0.060 deep, for seating the compliant pads, and include a series of slots 11d 0.010 wide, at a radius of approximately 4.55 inches and of total open area about the circumference path of the slots of less than 50%, to permit cooling water flow (maintained at positive pressure, above that of the regulated gas supply pressure) to pass from the inlet port 25 having O-ring 26, through the compliant pad element 21, passing around the multiplicity of smaller pad element features 21a thereof and into an annular space 27 functioning as a cooling jacket between the housing and the multi-cell stack or module. The material of endplates 11 is preferably pure aluminum, type 1100-H0, 0.125 inches thick, and preferably has an 16 RMS (or better) finish, as provided by use of an electro-polishing process similar to ABLE-BRIGHT, and an inorganic corrosion inhibitor/catalytic shield, conductive, of approximately 2 microns thickness, similar to the MICROSEAL Process.

Hydrogen and oxygen feed passages 16 and 17, respectively, permitting gas flow to the multi-cell stack. Preferably, a minimum of up to 6 each of the hydrogen feed passages 16 and up to 6 each of the oxygen feed passages 17 are provided equally spaced, and alternating on a 8.375 diameter pitch circle, with a passage diameter of 0.312 inches. The number of feed passages is preferably related to the waffle plate gas distribution pattern of bipolar plates 14 employed for the cells 10, described in reference to FIGS. 9 and 10. Additionally, this hole pattern may be employed as a desirable fixturing means, whereby dowels mounted through the base end plate (with housing already attached) may be used to provide alignment reference for the elements of the multi-cell stack, and permit the use of automated "pick and place" machinery. The purpose of said approach, is to permit the full and complete assembly operation sequence to end with attachment and preload of the top end plate, prior to removal of the assembled PEMFC configuration from the dowel alignment fixture. Control of dimensional stackup/performance of repetitive assembly operations is thereby effected and capability to achieve automated, high speed production is realized.

Inline quill features 18 and 19 are preferably utilized for providing gas seal features between stacked PEMFC modules 1. Item 18 depicts a dual (redundant) static o-ring seal of approximately Shore 70A hardness, at greater than 10% squeeze. Item 19 depicts the quill body 0.75 diameter×0.875 long, is preferably aluminum, type 1100-H0, with the same Microseal Process as the end plates. The use of the quill feature is to provide a high confidence in the sealing integrity between stacked modules, preventing of possible mixing of leaking hydrogen and oxygen gas. In conjunction with the positive pressure water jacket feature previously described, a high degree of leaktight integrity is established for the resultant PEMFC assembly, and increased operational safety is achieved.

Housing 20 is preferably an alumina ceramic housing having for example, a height of 3.662 inches with a 10.25 OD×9.020 ID and having an electrical resistance of greater than $10^8$ ohm-cm, and an elastic modulus of greater than $30 \times 10^6$ psi. The associated spring stiffness of the housing is greater than $150 \times 10^6$ #/in. Bonded inserts 23a for anchoring bolts 23b are preferably provided 12 places, equally spaced at both the upper and lower surfaces of the housing, for example Item 23, 5/16×24UNF end plate mounting hardware. Both the upper and lower faces of the housing 20 are preferably 32 RMS (or better) surface finish, such that a good seal between the face of the housing and the respective collector plates 11a, 11b may be effected.

Preferably, compliant pad 21 is of nominal 0.080 thickness, of Viton or similar material, and with Shore 70A hardness. The preferred embodiment for this pad is one consisting of a multiplicity of raised smaller pad features 21a of approximately 0.25 diameter and 0.040 uncompressed height, on staggered spacing, and approximately 0.344 inch spacing interval, such that a 48% open area is achieved.

End plates 22 are preferably 0.625 thick×11.75 OD aluminum type MIC-6 (32 RMS finish, precision/dimensionally stable plate), and having the same ABLE-BRIGHT and MICROSEAL processes as current collectors 11a, 11b, such that a final finish of 16 RMS (or better) is achieved. Counterbore features, 12 places equally spaced, on a 9.625 diameter bolt circle, are provided for assuring that the Item 23 mounting hardware doesn't project above the upper and lower mating faces of the end plates. Item 24 holes feature, 21/64 diameter, are provided 6 places equally spaced, on a 10.875 diameter bolt circle, for 5/16×18 UNC mounting hardware, and provide means for effecting both a rigid mechanical and an electrical connectivity between the stacked modular assemblies.

FIGS. 9 depicts a cross-sectional (elevation) view, of the preferred embodiment multi-cell stack configuration. FIG. 10 depicts a related plan view of the bipolar plate detail. Based upon the employment of the bipolar plate approach, the cells 10 depicted are shown evident as being present between the neutral axes of the stack of bipolar plates. Each bipolar plate 13 acts as anode on one face 13a, and as cathode on the opposite face 13b, and provides integral gas distribution for both the hydrogen and oxygen supplies through corresponding grooves 13c. Sandwiched between each set of bipolar plates 13, are two porous electrodes 14a and 14b and a proton exchange membrane 15 therebetween. An annular gasket 12 is shown, for providing sealing about the "thick" porous electrode. Item 10 describes both the Mod.1 and Mod.2 cell configurations. The Mod.1 cell is approximately 0.133 inches thick, has an OD (D2) of 9.00", and has an active area of approximately 285 cm$^2$ with an OD (D1) of 7.50" OD. The Mod.2 cell is approximately 0.064 inches thick, has an OD (D2) of 9.00", and an identical active area as Mod.1.

Both the upper and lower current collector plates 11a, 11b act as one-half of a bipolar plate each, with the upper plate being the anode, and the lower plate the cathode.

The preferred material of gasket 12 is Viton (or similar material) having a Shore 70A hardness, 0.040 thick for Mod.1, or 0.020 thick for Mod.2, and with both having an OD of 9.00 inches, and an ID of 7.50 inches. By reference to both FIGS. 9 and 10, it is shown that this gasket provides a set of 12 symmetric holes, spaced evenly on a 8.375 pitch circle, and preferable of 0.312 inches diameter. These holes provide features for the passage of both hydrogen and oxygen gas. Cutout features 17a are shown in FIG. 10 as being located six places, equally spaced for making provision to feed oxygen gas to the bipolar plate. The gasket may be employed for both the hydrogen and the oxygen feed feature by simply "indexing" the gasket by 30 degrees rotation. This is shown by the phantom lines 16a, wherein the lower gasket on the opposite side of the bipolar plate is depicted as rotated 30 degrees from the top gasket. This gasket feature also preferably provides sealing of the gases contained within its boundary, and in yielding a high degree of compliance (low spring stiffness) for the non-conductive area of the cell. This high compliance assures that most of the preload compressive force generated by clamping of the end plates is applied to the active area.

The preferred bipolar plate 13 uses either 0.0625 thick (Mod.1) or 0.0312 thick (Mod.2) aluminum type 1100-H0, having a surface finish of 16 RMS (or better), as provided by an electro-polishing process similar to ABLE-BRIGHT, and an inorganic corrosion inhibitor/catalytic shield, conductive, of approximately 2 microns thickness, similar to the MICROSEAL Process. A waffle plate pattern with grooves 13c is preferably provided as depicted in FIG. 10. These grooves are formed on opposite surfaces of the bipolar plate by the raised pattern 13d and provide passage area for gas distribution over the cell active area. The groove patterns on the opposite surfaces are not a mirror image of each other because of the 30° offset mentioned above. The raised pattern 13d is preferably greater than 0.010 high, and spacing d1 between the grooves 13c equivalent to the electrode thickness. For Mod.1, this value would be approximately 0.0312 inches, and for Mod.2, would be approximately 0.016 inches. The identical pattern depicted in FIG. 10, viewing the top of a bipolar plate, is replicated on the bottom face but at an indexing of 30 degrees rotation. This assures the desirable alignment of the appropriate gas feed passages to the opposite faces of the bipolar plate. The bipolar plate preferred method of fabrication is by die stamp/hydraulic press, such that a finished plate configuration is achieved in a single manufacturing step. The electro-polishing and corrosion inhibiting processing steps provide the final steps in production of a finished product.

The preferred electrode 14 uses PG-60 porous graphite, and is manufactured by National Specialty Products, Division of Morganite Inc. in bole sizes of 7.50 diameter by 39 inches long. The preferred embodiment utilizes wafer slices from this boule, to fabricate either 0.031 thick (Mod.1), or 0.016 thick (Mod.2) electrode wafers. Rough cut wafers are preferable ground to final tolerance, and wet-proofed prior to incorporation into the cell subassembly.

Item 15 depicts the proton exchange membrane. The preferred membrane is Nafion type 117 for Mod.1, and type 112 for Mod.2. The membrane, with all completed post treatment processing, including addition of catalyst, is preferably die cut to 9.00 inch diameter as a final processing step.

FIG. 11 depicts a top assembly PEMFC configuration consisting of four stack modules 1, previously described. The additional preferred embodiment features shown are as follows: Manifold end caps 28, 29 are provided for both electrical isolation of the stack assembly, and features for internal manifold lines routing to each of the 0.312 diameter gas feed lines, and connection to the external gas supplies. Air-operated gas isolation valves 30 are fail-safe and shut-off with a loss of external control air pressure. An adapter fitting 31 is provided for connection to an external control air supply. Adapter fitting 57 is provided for connection to an external cooling water supply source. PEMFC electrical connection points 32 and 33 are provided for connection to the external load. Mounting hardware 34 provides for connection of each of the stack modules to one another.

Manifold configurations 28, 29 are preferably of 2.00 inch thick Delrin, or similar nonconductive material. The width is 11.75 inches, and the length is unspecified, but in increments of 11.75 inches×Number of Stacks in parallel. Supply manifold 28 preferably provides features for incorporation of air-operated cartridge valving for isolation of supply gases from the PEMFC stacks. Return manifold 29 preferably includes features for collection of recirculating gas and the associated vapor removal, and cooling water return. Manifold 28 preferably provides identical hole pattern interfacing features on both faces, such that a second four module stack assembly may be directly mounted inline with the first four module stack assembly. Mounting support features for an "as-assembled PEMFC" configuration may be provided as part of manifolds 28, 29, as dictated by the application/installation requirements.

The fail-safe gas isolation valves 30 are remotely operated from a separate control air source. This valving is preferably provided for means to incorporate safety interlocks into PEMFC operation, and to minimize any fire or explosion hazard. A female SAE O-ring port 31 provides connection to the external control air source.

Electrical connection points 32 and 33 are located 6 places, equally spaced, at the upper and lower points of the stack modules. Crimp terminal lugs would be employed for interfacing with the external electrical load.

Conventional mounting hardware 34 is used for effecting both mechanical and electrical connection between the respective stack modules.

Although particular embodiments have been described, various modifications will become apparent to one of ordinary skill in the art upon reading and understanding the foregoing description. All such modifications that basically rely upon the teachings through which the present invention has advanced the state of the art are properly considered within the spirit and scope of the invention.

I claim:

1. A proton exchange membrane fuel cell stack, comprising:

said stack having a housing and end plates disposed on opposite sides of the stack including means for providing fixed support of said end plates to said housing;

multiple fuel cells arranged in the stack, each of said fuel cells having an inactive area and an active area within which electrically conductive elements are disposed, including an electrically conductive first bipolar plate portion as an anode, an electrically conductive second bipolar plate portion as a cathode, a proton exchange membrane and first and second electrically conductive electrodes, said first and second electrodes being respectively in contact within said active area with opposed surfaces of said membrane and with corresponding ones of said first and second bipolar plate portions;

current collecting means electrically connecting said bipolar plate portions to an external load; and compliant pads disposed between said end plates and said current collecting means, and gaskets disposed in said inactive area for providing a spring stiffness in said inactive area that is less than that of said active area;

means applying a uniformed distribution of compressive force over the entirety of said active area of said multiple fuel cells with said means for providing fixed support of said end plates to said housing for increasing an effective area of said contact between said electrically conductive elements.

2. A fuel cell stack according to claim 1, wherein said compliant pads compensate for thermal expansion.

3. A fuel cell stack according to claim 2, wherein said housing is cylindrical, said first and second bipolar plate portions are opposite sides of a bipolar plate, and wherein said gaskets are annular gaskets disposed between plural ones of said bipolar plates on either side of said proton exchange membrane for directing the force applied by said compressive force applying means over said active area.

4. A fuel cell stack according to claim 1, wherein said first and second bipolar plate portions are opposite surfaces of a bipolar plate, and said bipolar plate is aluminum.

5. A fuel cell stack according to claim 4, wherein each of said opposite surfaces of said bipolar plate has a waffle plate pattern including raised portions and grooves, and wherein gas is distributed through said grooves.

6. A fuel cell stack according to claim 1, wherein said compliant pads have small pad portions of different elevation than a remainder area of said pads.

7. A fuel cell stack according to claim 1, wherein said means for electrically connecting said bipolar plate portions to an external load includes current collector plates on opposite sides of said stack.

8. A fuel cell stack according to claim 1, further comprising said housing being a cylindrical housing externally arranged about said stack and an annular space between said housing and said stack that provides a cooling water jacket.

9. A fuel cell stack according to claim 1, wherein said end plates have means electrically connecting one said fuel cell stack with an adjacent said fuel cell stack.

10. A fuel cell stack according to claim 1, wherein said fuel cell stack includes means for connecting a fuel gas and an oxidant gas to the interior portion of said fuel stack through said end plates.

11. A fuel cell stack according to claim 1, wherein said first and second electrodes are porous graphite electrodes.

12. A fuel cell stack according to claim 2, wherein said complaint pads have surface features providing a shape factor.

13. A fuel cell stack according to claim 12, wherein said surface features including a plurality of circular pad areas.

14. A proton exchange membrane fuel cell stack having a plurality of fuel cells, comprising:

said stack having a housing and end plates disposed on opposite sides of the stack including means for providing fixed support of said end plates to said housing;

each said fuel having an inactive area and an active area in which electrically conductive elements are disposed, including an anode, a cathode, a proton exchange medium, electrodes electrically connecting said anode and said cathode on opposite sides of said membrane and means electrically connecting said anode and cathode to an external load, wherein within said active area, said electrodes are respectively in contact with opposed surfaces of said membrane and with corresponding ones of said anode and cathode;

means providing fuel and an oxidant to each of said fuel cells;

compliant pads disposed between said end plates and said current collecting means, and gaskets disposed in said inactive area for providing a spring stiffness in said inactive area that is less than that of said active area;

means applying a uniform distribution of compressive force over the entirety of said active area of said fuel cells with said means for providing fixed support of said end plates to said housing to increase an effective area of said contact between each of said electrically conductive elements.

15. A proton exchange membrane fuel cell stack, comprising:

multiple fuel cells arranged in the stack, said stack having a housing and end plates disposed on opposite sides of the stack including means for providing fixed support of said end plates to said housing;

each said fuel cell having an inactive area and an active area in which electrically conductive elements are disposed, including an electrically conductive first bipolar plate portion as an anode, an electrically conductive second bipolar plate portion as a cathode, a proton exchange membrane and first and second electrically conductive electrodes respectively in contact with opposed surfaces of said membrane and each of said first and second bipolar plate portions;

current collecting means electrically connecting said bipolar plate portions to an external load;

compliant pads disposed between said end plates and said current collecting means, and gaskets disposed in said inactive area for providing a spring stiffness in said inactive area that is less than that of said active area; and means for generating a sufficiently high uniform distribution of compressive stress over the entirety of said active area of said multiple fuel cells with said means for providing fixed support of said end plates to said housing to reduce contact voltage drops between said electrically conductive elements within said active area.

* * * * *